United States Patent [19]
Yoakum

[11] 3,787,061
[45] Jan. 22, 1974

[54] ELASTOMERIC SEAL
[76] Inventor: Ronald E. Yoakum, R.R. 1, Union, Ohio 45322
[22] Filed: May 17, 1971
[21] Appl. No.: 143,922

[52] U.S. Cl............... 277/164, 52/20, 52/396, 277/207, 285/110, 285/236
[51] Int. Cl............................................. F16j 15/32
[58] Field of Search....... 285/110, 35, 321, 97, 236, 285/189, 192; 52/396, 20; 277/207, 34, 34.3, 138, 146, 147, 151, 157, 164, 237 A

[56] References Cited
UNITED STATES PATENTS
3,591,190  7/1971  Winay................................ 277/164
307,682  11/1884  Roberts.......................... 277/237 A
2,209,235  7/1940  Nathan........................... 277/207 A FOREIGN PATENTS OR APPLICATIONS
587,778  11/1959  Canada................................. 285/97
1,009,110  11/1965  Great Britain...................... 277/207

Primary Examiner—Louis R. Prince
Assistant Examiner—Robert I. Smith

[57] ABSTRACT
A seal for making leakproof, durable and adjustable telescoping connections for piping and the like comprises a generally cylindrical body portion of flexible elastomeric material having a pair of ribs extending inwardly and toward opposite ends of the body portion, which ribs are releasably biased inwardly and are adapted to be flattened into sealing engagement with the outer surface of a pipe or the like.

5 Claims, 3 Drawing Figures

PATENTED JAN 22 1974    3,787,061

INVENTOR.
RONALD E. YOAKUM

ELASTOMERIC SEAL

BACKGROUND

Vitrified clay pipe sections having bell and spigot ends are widely used in sewer line service and in other services where the requirements are severe. Ordinarily, such pipe sections are not manufactured with any great degree of accuracy and the bells of the sections may be warped or out of round, the bodies may be slightly curved and there may be surface defects. Because of such defects, great difficulties have been experienced in providing satisfactory joints which make good seals particularly since such service requirements additionally impose adverse conditions of use, such as use under water or in fills where earth movement unevenly loads and stresses adjacent pipe sections and portions thereof.

It is desirable that the pipe joints should permit settlement and movement of the pipe lines after the pipes have been laid and backfilled and should allow the pipe sections to be displaced angularly with respect to each other to permit adjustment of the pipeline to grade or curves both during and after assembly of the joints. Additionally, the joints should be leakproof against pressures up to the bursting strength of the pipe and against infiltration against pressures of the order that are likely to be encountered in trenches in which the pipe is to be laid, and the joint should remain leakproof against externally applied forces which tend to displace the pipe sections relative to each other and which are sufficient to crush the pipe.

In addition to systems of pipes and conduits, liquid collection and/or drainage systems additionally include control devices, pumping stations and appurtenances such as manholes which are access openings from the ground surface and which enable a workman to enter and make examinations or repairs to an underground pipe or conduit at locations where access is desired at selected spaced intervals along the pipe or conduit, or where changes in elevation or direction of the pipeline may occur.

The sidewalls of a manhole may be either concrete poured in the field or precast concrete riser sections superimposed upon one another with suitable joints therebetween. The lower end of the sidewall is connected to and supported by a concrete base or footing. Effecting a proper seal between the pipe and the manhole is a very difficult and serious problem. Heretofore, precast bases or footings with a pipe precast in the base and presealed to the lower portion of the manhole wall have been employed. However, since that type of base cannot be varied or changed after it has been manufactured and must be custom built for a particular manhole, it is not entirely satisfactory to accommodate job conditions which are subject to change. Additionally, the problem of effecting a suitable leakproof joint between the manhole and piping that may be connected thereto is subject to all of the above-noted difficulties and problems in effecting leakproof joints and pipes.

SUMMARY

Accordingly, it is a principal object of the present invention to provide means for obviating the above-noted difficulties and to provide means enabling the positioning of a precast manhole base at a desired location and maintaining effecting seals at the junctures between the manhole and its inlet and outlet pipe connections.

In accordance with the present invention, there is provided a seal having a body portion made of flexible elastomeric material positioned in one or more openings provided in the peripheral wall portion of a manhole base and integrally connected thereto for providing a suitable seal connection between the base and inlet and outlet pipes, and which permits independent movement of either said pipes or of the base.

DESCRIPTION

These and other objects of the present invention will become apparent from the following description taken in connection with the accompanying drawings, in which.

Figures 1, 2:
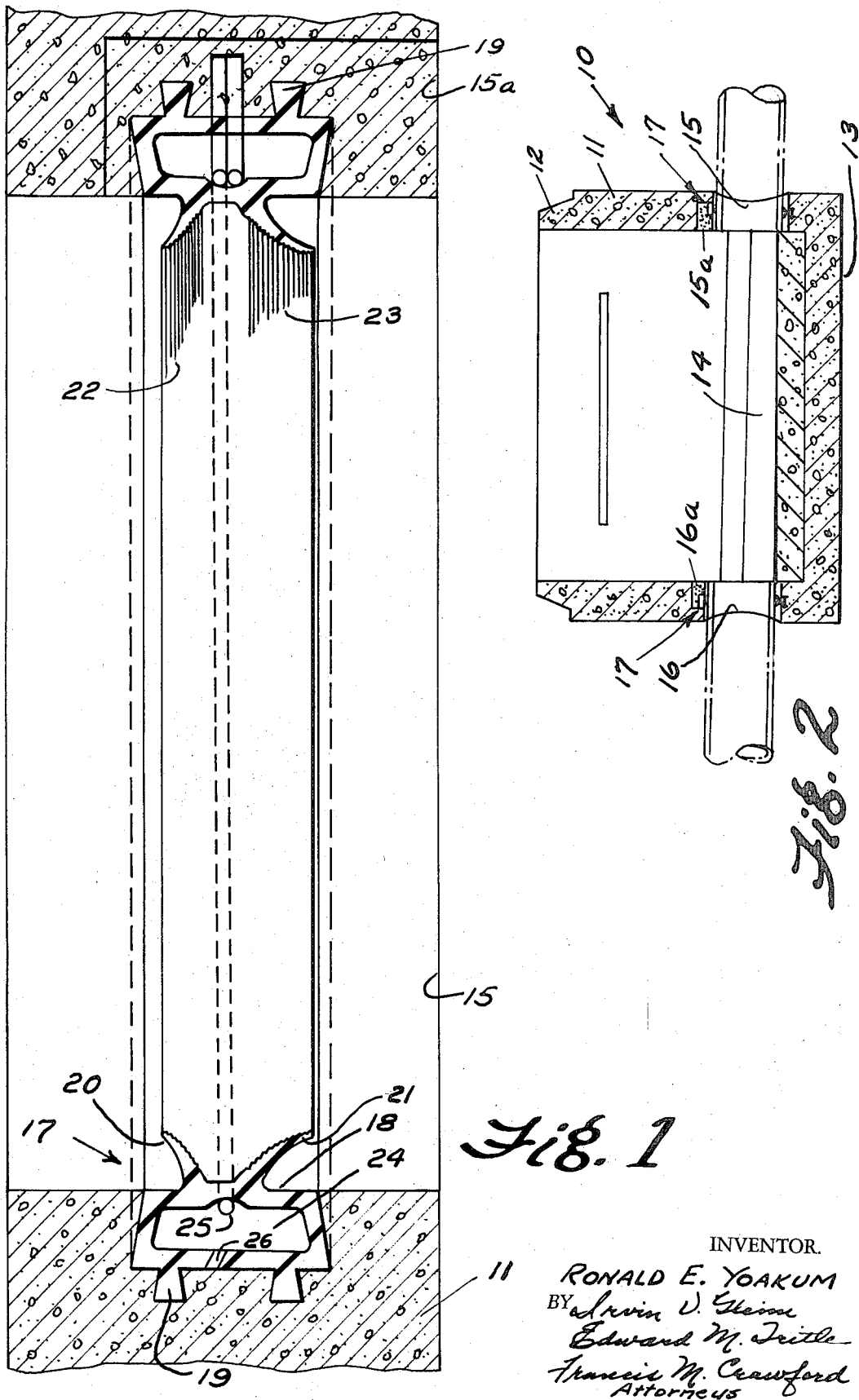
FIG. 1 is a sectional view of a seal embodying the present invention integrally connected to a fragmentary portion of the peripheral wall portion of a manhole base.
FIG. 2 is a sectional view of a precast manhole base illustrating how the embodiment of FIG. 1 is employed to seal one or more openings in the base.

Referring to the drawings, a precast manhole base of concrete embodying a seal in accordance with the present invention is indicated generally at 10. Base 10 includes a peripheral wall portion 11 which may include an annular rib 12 upstanding from the upper end thereof to facilitate connection to a riser section or sidewall portion of the manhole. The upstanding peripheral wall portion 11 is closed at its lower end by a bottom portion 13. If desired, the upper surface of the bottom portion may slope as desired and may also include a flow channel 14. Openings 15, 16 are provided in peripheral wall portion 11 for the insertion of inlet or outlet pipes shown in phantom lines. For reasons which will appear presently openings 15, 16 are provided with slightly enlarged cut-out portions, 15a, 16a.

In accordance with the present invention, the improved seal is indicated generally at 17. The seal comprises a body portion 18 that is generally cylindrical and is made of flexible elastomeric material. Body portion 18 includes tank portions 19 which assist in securing the seal in place in wall 11. Projecting inwardly from body portion 18 and toward the opposite edges thereof are a pair of tapering ribs 20, 21. If desired, to assist in the sealing action, the inner surfaces of ribs 20, 21 may be provided with a plurality of serrations 22, 23.

Adjacent the inner surface of body portion 18 and ribs 20, 21 there is provided a substantially enclosed opening 24 which adds to the flexibility of seal 17 and additionally provides a housing for a spring coil 25. The outer peripheral surface of body portion 18 is provided with a slot 26 which facilitates the insertion of spring coil 25 into opening 24 and permits the seal to be formed by an extrusion process if desired. Additionally, spring coil 25 includes end portions 27, 28 which extend outwardly through slot 26 for a purpose which will become apparent as the description proceeds.

If seal 17 is formed by an extrusion process, the straight lengths of flexible elastomeric material are cut to desired lengths and their ends joined together by vulcanizing or a like process to form body portion 18 into a generally cylindrical shape. The seal is then positioned at a desired location in a suitable form and the concrete base is formed in accordance with known concrete pouring procedures. Upon completion of the concrete pouring operation and hardening of the concrete, the concrete securely grips tangs 19 and firmly secures the seal in proper position within openings 15 or 16 as the case may be. The spring coil 25 can be inserted into opening 24 before or after the pouring operation but, in general, it probably will facilitate matters to insert the spring prior to the concrete pouring operation.

The end portions 27, 28 extend outwardly beyond the body portion 18 through slot 26 and to the cut-out portion 15a so that they are accessible after the concrete has hardened.

Figure 3:
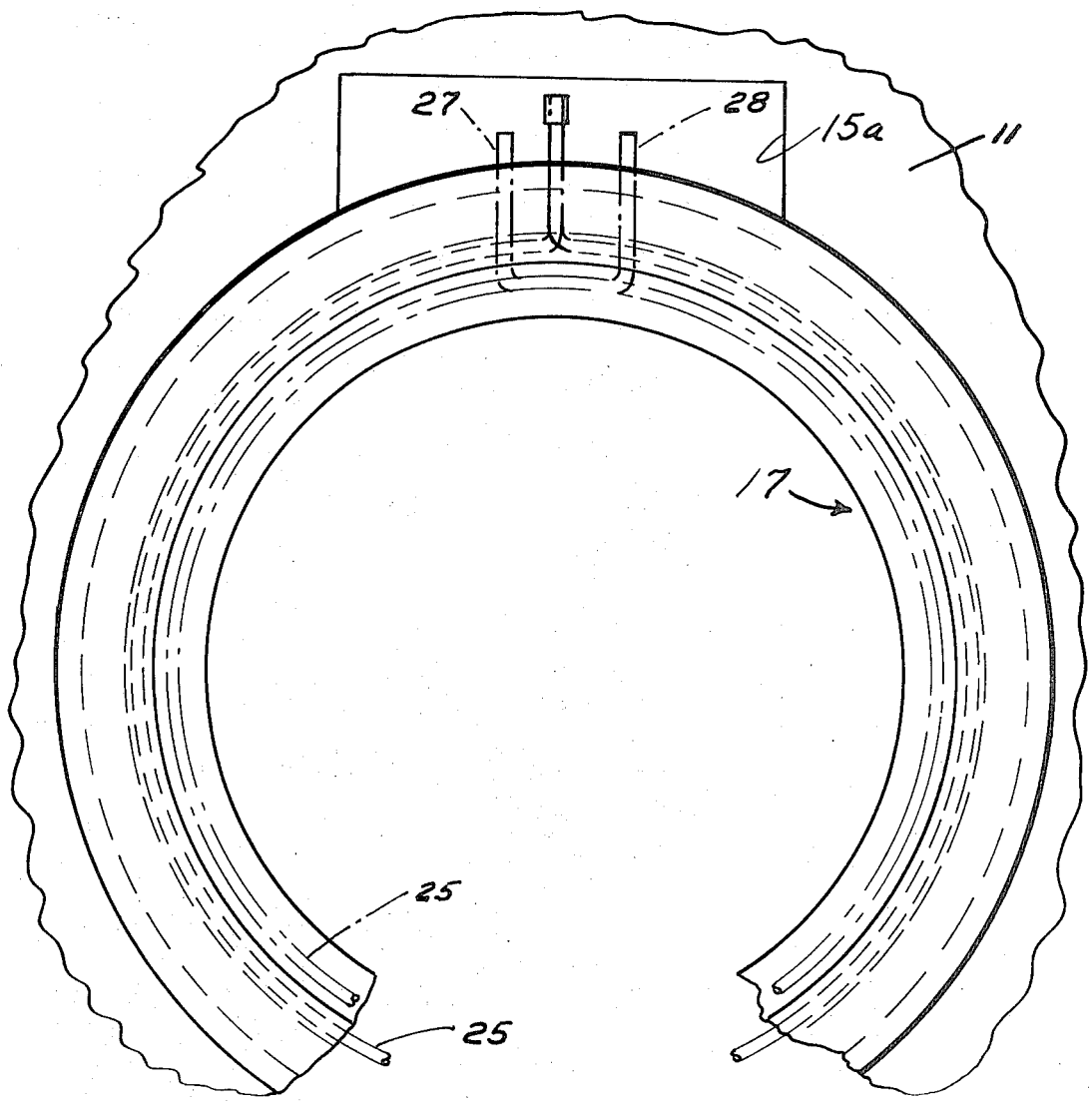
FIG. 3 is a fragmentary view, looking in the direction of arrows 3—3 of FIG. 1.

As is best shown in FIG. 3, when ends 27, 28 are squeezed together, the diameter of the spring coil is expanded and a section of pipe can be easily inserted into openings 15, 16 in the concrete and into the opening circumscribed by the tapering ribs 20, 21 of the seal. After the pipe section has been so inserted, the ends 27, 28 of the spring coil are released and the resiliency of the spring causes ends 27, 28 to move apart and the diameter of the spring coil to be reduced as is best shown in FIG. 3. In the reduced position of spring coil 25 the inner wall portion of body portion 18 is urged inwardly thus urging it and tapered rib portions 20, 21 into sealing engagement with the exterior surface of the pipe. The flexibility of the seal and its rib portions, 20, 21 allow considerable latitude of displacement and/or angularity of the pipe section to occur without disturbing the effectiveness of the seal provided by the tapering ribs 20, 21, and the serrations 22, 23 add to the effectiveness of the seal joint.

Thus, as noted heretofore, a precast base for a manhole and the like can be precast and shipped and/or stored when or until the base is to be installed at a job site. At installation, the contractor positions the precast base at a desired or specified location and installs a length of pipe or pipes into the manhole openings as noted above. Such pipes are plain and are merely cut to length with no prepared joint being required. After insertion of the pipe into the seal means 17, a sealed joint is automatically provided which requires no special sealant or finish between the joint and the manhole base or pipe. The remainder of the manhole is installed in the usual fashion and backfill is accomplished in the usual manner.

While particular embodiments of the invention have been illustrated and described, it will obvious to those skilled in the art that various changes and modifications may be made without departing from the invention and it is intended in the appended claims to cover all such changes and modifications that fall within the true spirit and scope of the invention.

What is claimed is:

1. A seal adapted to be fixed to a tubular wall portion of a monolithically cast concrete pre-formed structure comprising in combination
    an annular hollow elastomeric body having generally cylindrical inner and outer surfaces encompassing a central opening extending through said body,
    said body having a depending portion extending outwardly from said outer surface and adapted to be integrally formed with said tubular wall portion,
    a rib integral with said body and depending from said inner surface within said opening and extending toward one side of said body, and
    means within said hollow body biasing said inner surface and said rib into sealing engagement with a conduit means when said conduit means is removably inserted into said central opening and permitting independent universal movement of either said structure or said conduit means.

2. Structure according to claim 1 wherein the innermost surface of said rib includes serrated portions.

3. A seal according to claim 1 wherein said means within said hollow body includes spring means disposed in said opening and releasably biasing said rib inwardly, said spring means having end portions extending outwardly through a slot in said body.

4. A pipe joint comprising in combination
    a seal according to claim 3 connected to said structure,
    a pipe having an end portion disposed within said seal with said rib in sealing engagement with the external surface of said pipe.

5. A pipe joint comprising in combination
    a seal according to claim 1 connected to said structure,
    a pipe having an end portion disposed within said seal with said rib in sealing engagement with the external surface of said pipe.

* * * * *